United States Patent
Jeong et al.

(10) Patent No.: US 11,617,145 B2
(45) Date of Patent: Mar. 28, 2023

(54) METHOD AND APPARATUS FOR TIMING CONTROL IN WIRELESS COMMUNICATION SYSTEM

(71) Applicant: ELECTRONICS AND TELECOMMUNICATIONS RESEARCH INSTITUTE, Daejeon (KR)

(72) Inventors: Chan Bok Jeong, Daejeon (KR); Hoo Sung Lee, Sejong-si (KR); Moon Sik Lee, Daejeon (KR); Jae Woo Park, Daejeon (KR); Jae Seung Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 64 days.

(21) Appl. No.: 17/096,182

(22) Filed: Nov. 12, 2020

(65) Prior Publication Data

US 2021/0144664 A1    May 13, 2021

(30) Foreign Application Priority Data

Nov. 13, 2019  (KR) .......................... 10-2019-0145442
Nov. 11, 2020  (KR) .......................... 10-2020-0150272

(51) Int. Cl.
*H04W 80/02*  (2009.01)
*H04W 56/00*  (2009.01)
(Continued)

(52) U.S. Cl.
CPC ....... *H04W 56/0015* (2013.01); *H04L 5/0053* (2013.01); *H04W 64/003* (2013.01);
(Continued)

(58) Field of Classification Search
CPC ........... H04W 56/0015; H04W 64/003; H04W 72/0446; H04W 72/1263; H04W 80/02; H04W 88/085; H04L 5/0053
See application file for complete search history.

(56) References Cited

U.S. PATENT DOCUMENTS 10,284,318 B1 *  5/2019  Choudhury  ........... H04L 47/828
10,560,230 B2     2/2020  Kim et al.
(Continued)

FOREIGN PATENT DOCUMENTS

KR   10-2019-0015331 A   2/2019
WO   2019/243669 A1     12/2019

*Primary Examiner* — Lakeram Jangbahadur
(74) *Attorney, Agent, or Firm* — LRK Patent Law Firm

(57) ABSTRACT

A timing control method, performed by a first DU including a processor and a modem in a base station supporting function-splitting, includes obtaining, by the processor, first time information from a CU included in the base station; obtaining, by the processor, synchronization information with a first system based on the first time information; identifying, by the processor, a change time point of an SFN based on the synchronization information; generating, by the processor, a first timing control signal including a signal indicating a changed SFN and a first tick signal having a same periodicity as a change periodicity of the SFN when the SFN is changed; and providing, by the processor, the first timing control signal to the modem.

11 Claims, 6 Drawing Sheets

(51) Int. Cl.
*H04L 5/00* (2006.01)
*H04W 72/1263* (2023.01)
*H04W 64/00* (2009.01)
*H04W 72/0446* (2023.01)

(52) U.S. Cl.
CPC ... *H04W 72/0446* (2013.01); *H04W 72/1263* (2013.01); *H04W 80/02* (2013.01)

(56) References Cited

U.S. PATENT DOCUMENTS

| | | | |
|---|---|---|---|
| 2014/0219162 A1* | 8/2014 | Eyuboglu | H04J 11/00 370/315 |
| 2014/0293991 A1* | 10/2014 | Abraham | H04W 52/0225 370/350 |
| 2014/0298070 A1 | 10/2014 | Kim et al. | |
| 2015/0358945 A1* | 12/2015 | Susitaival | H04W 56/0015 370/329 |
| 2016/0295601 A1 | 10/2016 | Fang | |
| 2017/0141865 A1 | 5/2017 | Ha et al. | |
| 2018/0151013 A1 | 5/2018 | Carstens et al. | |
| 2018/0295591 A1* | 10/2018 | Eyuboglu | H04W 56/001 |
| 2021/0204230 A1* | 7/2021 | Van Phan | H04J 3/0667 |

\* cited by examiner

METHOD AND APPARATUS FOR TIMING CONTROL IN WIRELESS COMMUNICATION SYSTEM

CROSS-REFERENCE TO RELATED APPLICATIONS

This application claims priority to Korean Patent Applications No. 10-2019-0145442 filed on Nov. 13, 2019 and No. 10-2020-0150272 filed on Nov. 11, 2020 with the Korean Intellectual Property Office (KIPO), the entire contents of which are hereby incorporated by reference.

BACKGROUND

1. Technical Field

The present disclosure relates to a method and an apparatus for timing control in a wireless communication system, and more specifically, to a method and an apparatus for timing control in a wireless communication system that dynamically supports function-splitting.

2. Description of Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies. In order to process soaring wireless data after commercialization of the 4G communication system (e.g., communication system supporting the LTE), the 5G communication system (e.g., communication system supporting the NR) using a frequency band (e.g., frequency band of 6 GHz or above) higher than a frequency band (e.g., frequency band of 6 GHz or below) of the 4G communication system as well as the frequency band of the 4G communication system is being considered.

In order to construct a communication system with improved efficiency compared to the 4G LTE communication system, various function-splitting related technologies are being studied. The function-splitting may mean a technique for splitting functions of a base station into a plurality of units and operating them. For example, the function-splitting scheme may be implemented through a structure of central unit (CU) and distributed unit (DU) according to the 3GPP specifications. Alternatively, the function-splitting scheme may be implemented through a structure of O-RAN distributed unit (O-DU) and O-RAN radio unit (O-RU) according to open radio access network (O-RAN) alliance specifications. The O-DU and O-RU structure according to the O-RAN alliance specifications may correspond to the CU and DU structure according to the 3GPP specifications.

Here, for normal operations of units in a wireless communication system to which function-splitting is applied, a technique for performing accurate timing control on other units as well as units directly having timing information may be required.

SUMMARY

In order to solve the above-identified problems, exemplary embodiments of the present disclosure are directed to providing a method and an apparatus for accurately performing timing control for units splitting and performing functions of a base station in a wireless communication system to which a function-splitting technique is applied.

According to an exemplary embodiment of the present disclosure for achieving the above-described objective, a timing control method, performed by a first DU including a processor and a modulator and demodulator (modem) in a base station supporting function-splitting, may comprise obtaining, by the processor, first time information from a CU included in the base station; obtaining, by the processor, synchronization information with a first system based on the first time information; identifying, by the processor, a change time point of a system frame number (SFN) based on the synchronization information; generating, by the processor, a first timing control signal including a signal indicating a changed SFN and a first tick signal having a same periodicity as a change periodicity of the SFN when the SFN is changed; and providing, by the processor, the first timing control signal to the modem.

The timing control method may further comprise determining, by the processor, subframe number(s) of one or more subframes based on the change time point of the SFN; determining, by the processor, a change time point of each of the subframe number(s); generating, by the processor, a second timing control signal including a signal indicating a changed subframe number and a second tick signal having a same periodicity as a change periodicity of the subframe number at the change time point of each of the subframe number(s); and providing, by the processor, the second timing control signal to the modem.

The timing control method may further comprise determining, by the processor, slot number(s) of one or more slots constituting the one or more subframes; determining, by the processor, a change time point of each of the slot number(s) based on the change time point of each of the subframe number(s); generating, by the processor, a third timing control signal including a signal indicating a changed slot number and a third tick signal indicating a change of the slot number at the change time point of each of the slot number(s); and providing, by the processor, the third timing control signal to the modem.

The timing control method may further comprise determining, by the processor, symbol number(s) of one or more symbols constituting the one or more slots; determining, by the processor, a change time point of each of the symbol number(s) based on the change time point of each of the slot number(s); generating, by the processor, a fourth timing control signal including a changed symbol number and a fourth tick signal indicating a change of the symbol number at the change time point of each of the symbol number(s); and providing, by the processor, the fourth timing control signal to the modem.

The synchronization information with the first system may be provided from the CU that has previously performed synchronization with the first system to the first DU, based on the first time information.

The first time information may be coordinated universal time (UTC) information, and the first system may be a global positioning system (GPS).

The timing control method may be performed in a synchronization plane (S-plane) of the first DU.

The obtaining of the first time information may be performed based on IEEE 1588 protocol.

According to an exemplary embodiment of the present disclosure for achieving the above-described objective, a first DU included in a base station supporting function-splitting may comprise a processor; a modulator and demodulator (MODEM); a memory electronically communicating with the processor; and instructions stored in the memory, wherein when executed by the processor, the instructions cause the first DU to: obtain, by the processor, first time information from a CU included in the base station; obtain, by the processor, synchronization information with a first system based on the first time information; identify, by the processor, a change time point of an SFN based on the synchronization information; generate, by the processor, a first timing control signal including a signal indicating a changed SFN and a first tick signal having a same periodicity as a change periodicity of the SFN when the SFN is changed; and provide, by the processor, the first timing control signal to the modem.

The instructions may further cause the first DU to: determine subframe number(s) of one or more subframes based on the change time point of the SFN; determine a change time point of each of the subframe number(s); generate a second timing control signal including a signal indicating a changed subframe number and a second tick signal having a same periodicity as a change periodicity of the subframe number at the change time point of each of the subframe number(s); and provide the second timing control signal to the modem.

The instructions may further cause the first DU to: determine slot number(s) of one or more slots constituting the one or more subframes; determine a change time point of each of the slot number(s) based on the change time point of each of the subframe number(s); generate a third timing control signal including a signal indicating a changed slot number and a third tick signal indicating a change of the slot number at the change time point of each of the slot number(s); and provide the third timing control signal to the modem.

The instructions may further cause the first DU to: determine symbol number(s) of one or more symbols constituting the one or more slots; determine a change time point of each of the symbol number(s) based on the change time point of each of the slot number(s); generate a fourth timing control signal including a changed symbol number and a fourth tick signal indicating a change of the symbol number at the change time point of each of the symbol number(s); and provide the fourth timing control signal to the modem.

The synchronization information with the first system may be provided from the CU that has previously performed synchronization with the first system to the first DU, based on the first time information.

The first time information may be coordinated universal time (UTC) information, and the first system is a global positioning system (GPS).

According to an exemplary embodiment of the present disclosure for achieving the above-described objective, a timing control method, performed by a first communication node including a processor and a modulator and demodulator (MODEM) in a base station supporting function-splitting, may comprise: obtaining, by the processor, first time information from a second communication node included in the base station; obtaining, by the processor, synchronization information with a first system based on the first time information; identifying, by the processor, a change time point of an SFN based on the synchronization information; generating, by the processor, a first timing control signal including a signal indicating a changed SFN and a first tick signal having a same periodicity as a change periodicity of the SFN when the SFN is changed; and providing, by the processor, the first timing control signal to the modem, wherein the first communication node and the second communication node correspond to an O-RU and an O-DU according to O-RAN alliance communication specifications, respectively.

The timing control method may further comprise determining, by the processor, subframe number(s) of one or more subframes based on the change time point of the SFN; determining, by the processor, a change time point of each of the subframe number(s); generating, by the processor, a second timing control signal including a signal indicating a changed subframe number and a second tick signal having a same periodicity as a change periodicity of the subframe number at the change time point of each of the subframe number(s); and providing, by the processor, the second timing control signal to the modem.

The timing control method may further comprise determining, by the processor, slot number(s) of one or more slots constituting the one or more subframes; determining, by the processor, a change time point of each of the slot number(s) based on the change time point of each of the subframe number(s); generating, by the processor, a third timing control signal including a signal indicating a changed slot number and a third tick signal indicating a change of the slot number at the change time point of each of the slot number(s); and providing, by the processor, the third timing control signal to the modem.

The timing control method may further comprise determining, by the processor, symbol number(s) of one or more symbols constituting the one or more slots; determining, by the processor, a change time point of each of the symbol number(s) based on the change time point of each of the slot number(s); generating, by the processor, a fourth timing control signal including a changed symbol number and a fourth tick signal indicating a change of the symbol number at the change time point of each of the symbol number(s); and providing, by the processor, the fourth timing control signal to the modem.

The synchronization information with the first system may be provided from the second communication node that has previously performed synchronization with the first system to the first communication node, based on the first time information.

The first time information may be coordinated universal time (UTC) information, and the first system may be a global positioning system (GPS).

According to an exemplary embodiment of the present disclosure, the DU constituting the base station to which function-splitting is applied may obtain time information and synchronization information from the CU constituting the same base station and a GPS, and perform synchronization with the CU based on them. According to an exemplary embodiment of the present disclosure, the DU constituting the base station to which function-splitting is applied may generate a timing control signal based on the time information and synchronization information obtained from the CU and the GPS, and provide the generated timing control signal to the modem of the DU. Accordingly, the modem of the DU may be operated with the same timing information as the CU directly having the timing information of the base station, thereby improving the reliability of the base station functions.

DETAILED DESCRIPTION OF THE EMBODIMENTS

Figure 1:
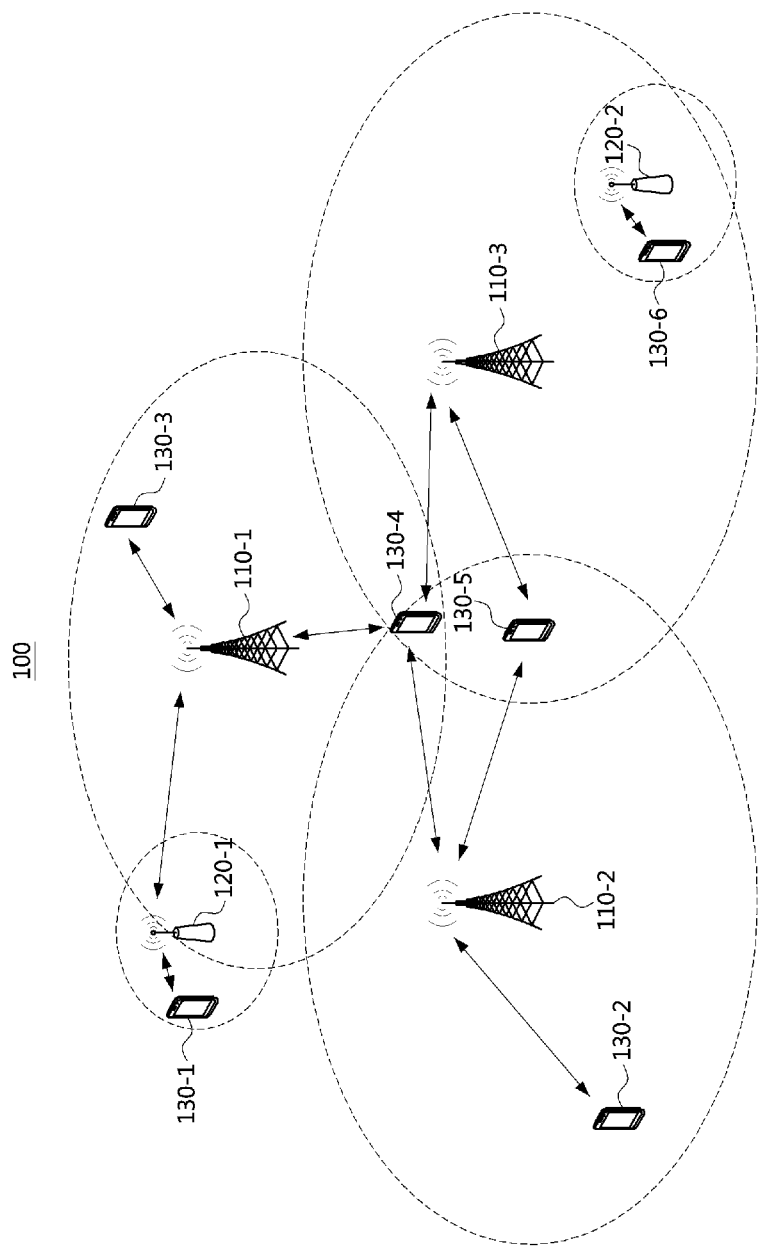
FIG. 1 is a conceptual diagram illustrating an exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the specification, a network may include, for example, a wireless Internet such as wireless fidelity (WiFi), mobile Internet such as wireless broadband Internet (WiBro) or world interoperability for microwave access (WiMax), 2G mobile communication network such as global system for mobile communication (GSM) or code division multiple access (CDMA), 3G mobile communication network such as wideband code division multiple access (WCDMA) or CDMA2000, 3.5G mobile communication network such as high speed downlink packet access (HSDPA) or high speed uplink packet access (HSDPA), 4G mobile communication network such as long term evolution (LTE) network or LTE-Advanced network, 5G mobile communication network, or the like.

Throughout the specification, a terminal may refer to a mobile station, mobile terminal, subscriber station, portable subscriber station, user equipment, an access terminal, or the like, and may include all or a part of functions such as the terminal, mobile station, mobile terminal, subscriber station, mobile subscriber station, user equipment, access terminal, or the like.

Here, a desktop computer, a laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like may be used as the terminal.

Throughout the specification, the base station may refer to an access point, radio access station, node B, evolved node B (eNodeB), base transceiver station, mobile multihop relay (MMR)-BS, or the like, and may include all or part of functions such as the base station, access point, radio access station, nodeB, eNodeB, base transceiver station, and MMR-BS.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a communication system.

As shown in FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4G communication (e.g., long term evolution (LTE), LTE-Advanced (LTE-A)), 5G communication (e.g., new radio (NR)), or the like specified in the 3rd generation partnership project (3GPP) specifications. The 4G communication may be performed in a frequency band of 6 GHz or below, and the 5G communication may be performed in a frequency band of 6 GHz or above as well as the frequency band of 6 GHz or below.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may include a serving-gateway (S-GW), packet data network (PDN)-gateway (P-GW), mobility management entity (MME), and the like. When the communication system 100 supports the 5G communication system, the core network may include a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
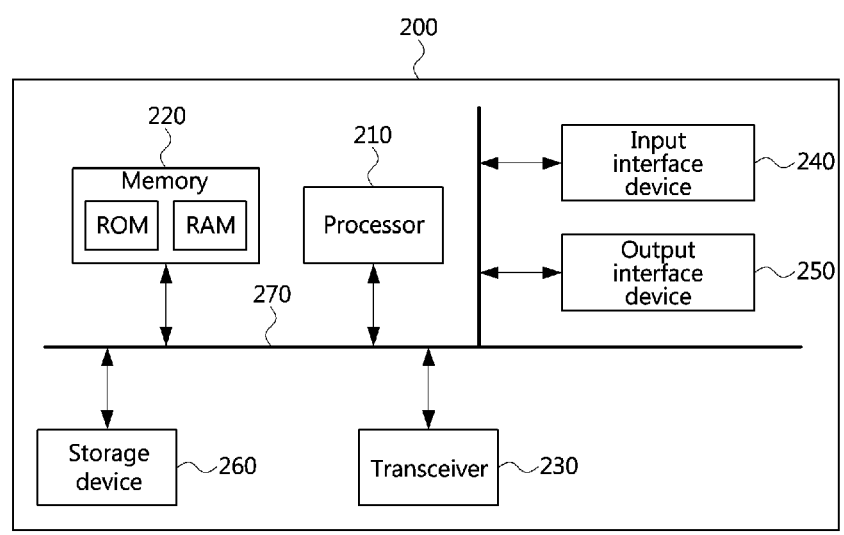
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a gNB, an ng-gNB, a base transceiver station (BTS), a radio base station, a radio transceiver, an access point, an access node, a road side unit (RSU), a radio remote head (RRH), a transmission point (TP), a transmission and reception point (TRP), a flexible (f)-TRP, or the like.

Each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal), an on-board device/terminal, or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for configuring and managing radio interfaces in a communication system will be described. Even when a method (e.g., transmission or reception of a signal) performed at a first communication node among communication nodes is described, the corresponding second communication node may perform a method (e.g., reception or transmission of the signal) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

Meanwhile, in a communication system, a base station may perform all functions (e.g., remote wireless transmission/reception function, baseband processing function, etc.) of a communication protocol. Alternatively, among all the functions of the communication protocol, the remote wireless transmission/reception function may be performed by a transmission reception point (TRP) (e.g., flexible (f)-TRP), and the baseband processing function may be performed by a baseband unit (BBU) block. The TRP may be a remote radio head (RRH), a radio unit (RU), a transmission point (TP), or the like. The BBU block may include at least one BBU or at least one digital unit (DU). The BBU block may be referred to as a 'BBU pool', 'centralized BBU', or the like. The TRP may be connected to the BBU block through a wired fronthaul link or a wireless fronthaul link. A communication system composed of backhaul links and fronthaul links may be as follows. When a function-splitting scheme of the communication protocol is applied, the TRP may selectively perform some functions of the BBU or medium access control (MAC) and radio link control (RLC) layers.

Figure 3:
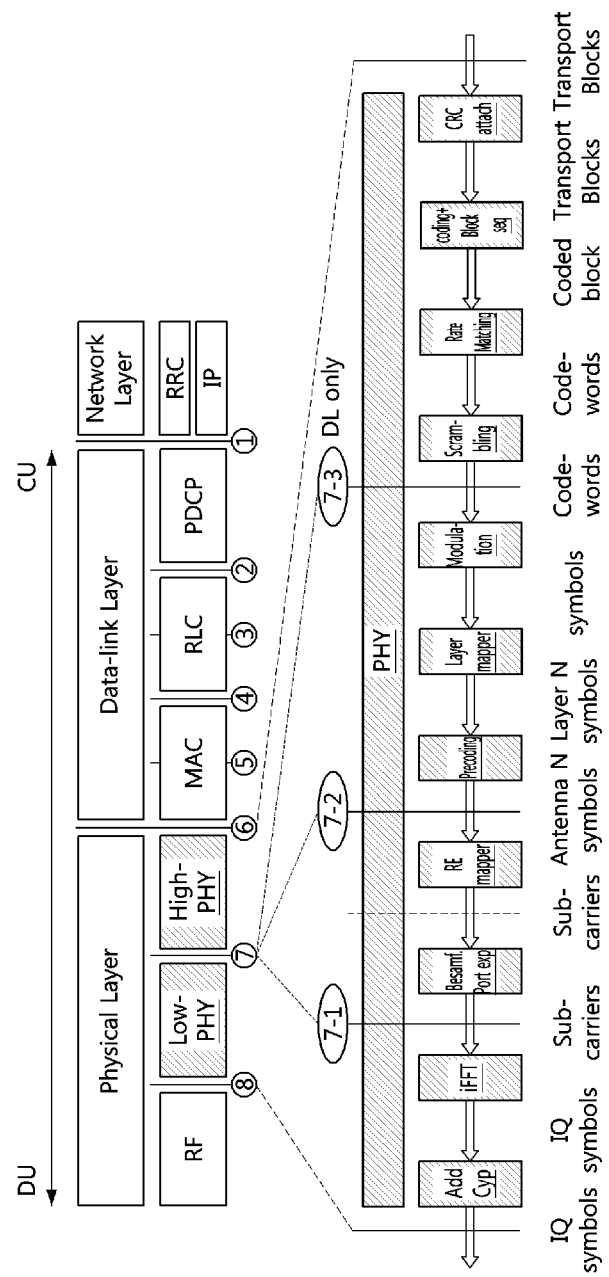
FIG. 3 is a conceptual diagram illustrating a first exemplary embodiment of a communication system to which function-splitting is applied.

FIG. 3 is a conceptual diagram illustrating a first exemplary embodiment of a communication system to which function-splitting is applied.

A communication system according to the 4G LTE technology may be configured based on a structure of digital units (DUs) and radio units (RUs). The DU may be installed at a central office of a mobile telecommunication operator, and the RU may be installed at a cell site. A common public radio interface (CPRI) may be used as an interface between the DU and the CU.

Meanwhile, a wide bandwidth and a large-scale MIMO may be applied to the 5G NR communication system to achieve 5G service requirements. In order to achieve the 5G service requirements in the 5G NR communication system by using the DU-RU structure of the 4G LTE communication system, a fairly high transmission rate may be required for the interface between the DU and RU. For example, a transmission rate required for the interface between the DU and the RU may be 230 Gbps or more. Such the scheme may incur enormous 5G fronthaul construction costs.

Meanwhile, the CPRI interface applied to the DU-RU structure of the 4G LTE communication system may be configured to comply with a unique fronthaul specification developed for each radio access network (RAN) vendor. In this reason, there may be a problem that entry of new vendors may be substantially restricted due to a non-disclosure of the unique fronthaul specification developed for each vendor.

As a solution to the problem of the DU-RU structure of the 4G LTE communication system, various 'function-splitting' related technologies are being studied. The 'function-splitting' may also be referred to as 'function separation'. The function-splitting may mean a technique for splitting functions of a base station into a plurality of units and operating them. For example, the function-splitting scheme may be implemented through a central unit (CU) and distributed unit (DU) structure in the 3GPP specification. The CU may mean a logical node that performs a centralized function of a base station. In addition to the functions assigned to the DU, the CU may perform base station functions such as user data transmission, mobility control, radio access network sharing, positioning, session management, and the like. According to a specific exemplary embodiment, the CU may also be referred to as a BBU, REC, RCC, C-RAN or V-RAN. The DU may mean a logical node that performs a distributed function of the base station. The DU may perform a subset of divided or distributed base station functions according to a function-splitting option. The CU may control operations of the DU through a fronthaul interface. According to a specific exemplary embodiment, the DU may also be referred to as an RRH, RRU, RE or RU. In a communication system to which the function-splitting is applied, an interface capacity required between CUs and DUs may be reduced, so that the construction costs of the radio access network may be reduced. In addition, an open interface may be used in the communication system to which the function-splitting is applied, and thus entry of a new vendor may be relatively easy.

Referring to FIG. 3, in the CU-DU structure according to the 3GPP specification, the functions of the base station may be split based on a plurality of options. For example, the functions of the base station may be split according to any one of options 1 to 8. For example, the functions of the base station may be split according to the option 7 which means splitting at PHY functions. According to the option 7, the CU may perform up to a higher-level PHY function (i.e., High-PHY) of the base station, and the DU may perform from a lower-level PHY function (i.e., Low-PHY) of the base station. In particular, the option 7 may be subdivided into options 7-1, 7-2, and 7-3, depending on a position of a function-splitting point for the PHY function. The communication system to which the function-splitting is applied may have different technical characteristics according to the function-splitting option. For example, the communication system to which the function-splitting option 7-2 is applied requires only a relatively small fronthaul transmission capacity compared to the communication system to which the function-splitting option 8 is applied, and thus, compression of a fronthaul transmission signal may not be required.

Meanwhile, the function-splitting scheme may be implemented through a structure of an O-RAN distributed unit (O-DU) and an O-RAN radio unit (O-RU) according to an open radio access network alliance (O-RAN) specification. The O-DU and O-RU structure according to the O-RAN alliance specification may correspond to the CU and DU structure according to the 3GPP specification.

In the present specification, for convenience of description, a communication system having a CU-DU structure according to the 3GPP specification is used as an example to describe the configuration and features of the present disclosure. However, exemplary embodiments of the present disclosure are not limited thereto. For example, exemplary embodiments of the present disclosure may be applied equally or similarly to a communication system having the O-DU and O-RU structure according to the O-RAN alliance specification.

Figure 4:
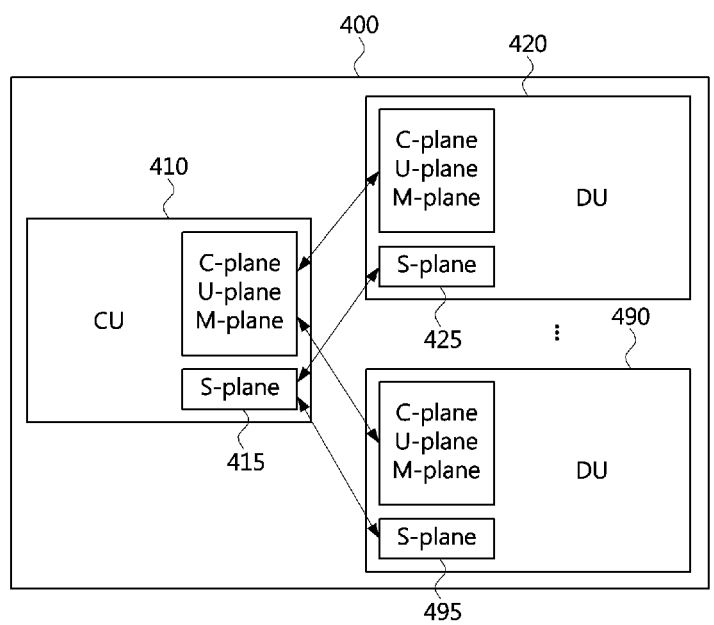
FIG. 4 is a conceptual diagram illustrating a second exemplary embodiment of a communication system to which function-splitting is applied.

FIG. 4 is a conceptual diagram illustrating a second exemplary embodiment of a communication system to which function-splitting is applied.

Referring to FIG. 4, a communication system may include a base station 400. For example, the base station 400 may be a 4G LTE-based eNodeB (eNB). Alternatively, the base station 400 may be a 5G NR-based gNodeB (gNB). The function-splitting described with reference to FIG. 3 may be applied to the base station 400. The base station 400 may be composed of one CU 410 and one or more DUs 420 . . . 490.

Control or interworking between the CU 410 and the DUs 420, . . . , and 490 may be performed through a control plane (C-plane), a user plane (U-plane), a management plane (M-plane), a synchronization plane (S-plane), and the like. Real-time control between the CU 410 and the DUs 420, . . . , and 490 may be performed through the C-plane. I/Q sample data transmission and reception between the CU 410 and the DUs 420, . . . , and 490 may be performed through the U-plane. Non-real-time management operations between the CU 410 and the DUs 420, . . . , and 490 may be performed through the M-plane. Synchronization control between the CU 410 and the DUs 420, . . . , and 490 may be performed through the S-planes 415, 425, . . . , and 495.

Synchronization control between the CU 410 and the DUs 420, . . . , and 490 may be performed through the interfaces between the S-plane 415 of the CU 410 and the S-planes 425, . . . , and 495 of the DUs 420, . . . , and 490. In the S-plane, a reference time transmission operation or protocol for time synchronization or timing synchronization may be performed. In the S-plane, a synchronization operation based on a precision time protocol (PTP) that enables accurate synchronization between networks may be performed. For example, a synchronization operation based on the IEEE 1588 protocol may be performed on the S-plane. The IEEE 1588 protocol is a type of PTP, and accuracy in nanoseconds may be expected by using a time stamp generated in hardware. In the S-plane, an IEEE 1588 grand master clock may be used to support the IEEE 1588 protocol. However, this is only an example for description, and various types of synchronization operations may be performed in addition to the S-plane. For example, a synchronization operation based on a network time protocol (NTP) or a synchronization operation based on a global positioning system (GPS) may be performed in the S-plane.

Figure 5:
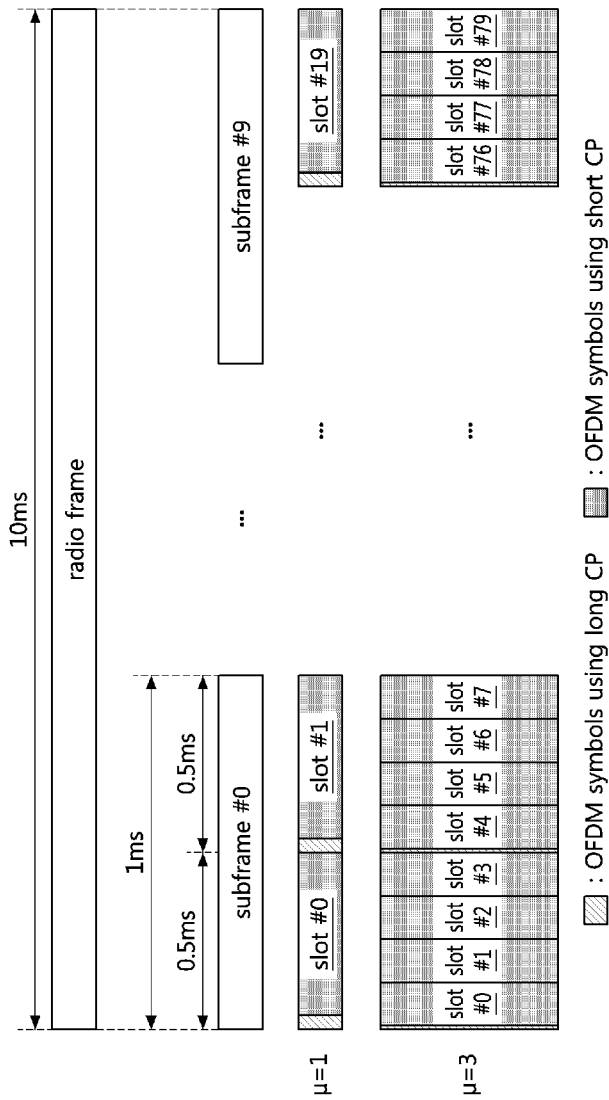
FIG. 5 is a conceptual diagram illustrating an exemplary embodiment of a radio frame transmitted and received in a communication system to which function-splitting is applied.

FIG. 5 is a conceptual diagram illustrating an exemplary embodiment of a radio frame transmitted and received in a communication system to which function-splitting is applied.

Referring to FIG. 5, in the communication system to which function-splitting is applied, one radio frame may be composed of a plurality of subframes. For example, one radio frame may consist of 10 subframes. Each radio frame may have a length of 10 ms. Alternatively, each radio frame may be updated at a periodicity of 10 ms. Each subframe may have a length of 1 ms. Alternatively, each subframe may be updated at a periodicity of 1 ms.

One subframe may comprise a plurality of slots. One slot may include a plurality of subcarriers in the frequency domain. One slot may have a plurality of symbols in the time domain. A plurality of symbols in the time domain may be OFDM symbols. In the following, for convenience, an exemplary embodiment in which a plurality of symbols in the time domain are OFDM symbols is described as an example, but exemplary embodiments of the present disclosure are not limited thereto.

The number of slots that one subframe has in the time domain may be set differently according to a numerology. For example, the number of slots that one subframe has in the time domain may vary according to a value of μ according to a subcarrier spacing (SCS).

μ may have a value of any one of integers from 0 to 4. As the value of μ is closer to 0, the SCS may be shorter in the frequency domain, and as the value of μ is closer to 4, the SCS may be longer in the frequency domain. As the value of μ is closer to 0, the length of the symbol may be longer in the time domain, and as the value of μ is closer to 4, the length of the symbol may be shorter in the time domain. As the value of μ is closer to 0, the number of slots in the time domain of one subframe may be smaller, and as the value of μ is closer to 4, the number of slots that the subframe has in the time domain may increase. The number of slots that one subframe has in the time domain may be proportional to $2^\mu$. For example, according to the exemplary embodiment shown in FIG. 5, when μ=1, each subframe may have two slots in the time domain. In this case, one radio frame may have 20 slots. Meanwhile, when μ=3, each subframe may have 8 slots in the time domain. In this case, one radio frame may have 80 slots.

The slots may be composed of OFDM symbols using a short cyclic prefix (short-CP), and may additionally include OFDM symbols using a long-CP. The short-CP may mean a normal-CP defined in the 3GPP communication specification. The long-CP may mean an extended-CP defined in the 3GPP communication specification.

When the value of μ is 0 or 1, all slots may be configured to include OFDM symbols using the long-CP. On the other hand, when the value of μ is 2 to 4, some slots may be configured to include OFDM symbols using the long-CP, and the remaining slots may be configured only with OFDM symbols using the short-CP.

Figure 6:
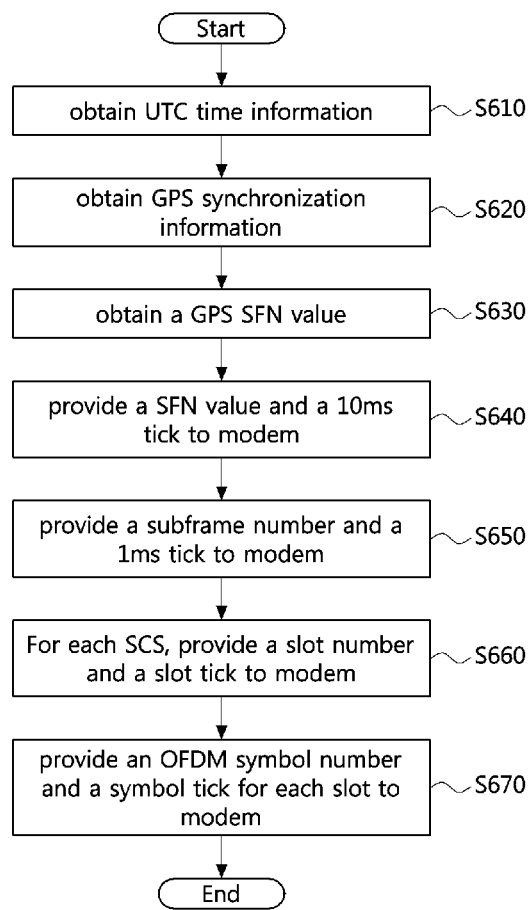
FIG. 6 is a flow chart illustrating an exemplary embodiment of a method of generating and transmitting timing information in a communication system to which function-splitting is applied.

FIG. 6 is a flow chart illustrating an exemplary embodiment of a method of generating and transmitting timing information in a communication system to which function-splitting is applied.

Referring to FIG. 6, the communication system according to the present disclosure may include a base station to which function-splitting is applied. The base station may include a first communication node and a second communication node. The first communication node may refer to at least one or more DUs performing a distributed function of the base station, and the second communication node may refer to a CU performing a central function of the base station. The first and second communication nodes may mean the DU and CU according to the CU-DU structure according to the 3GPP specification described with reference to FIG. 3.

Synchronization control between the CU and the DU may be performed through the S-plane. In the S-plane, a reference time transmission operation or protocol for time synchronization or timing synchronization may be performed. In the S-plane, a synchronization operation based on the PTP that enables accurate synchronization between networks may be performed. For example, in the S-plane, a synchronization operation based on the IEEE 1588 protocol may be performed. However, this is only an example for description, and various types of synchronization operations in addition to the above operations may be performed in the S-plane.

The DU may include a processor and a MOdulator and DEModulator (MODEM). Hereinafter, operations of the DU described with reference to FIG. 6 may be performed by the processor of the DU.

In the S-plane, the DU may receive first time information from the CU (S610). The first time information may be information on coordinated universal time (UTC). The DU may receive first time information from the CU according to the IEEE 1588 protocol. The DU may receive synchronization information with a GPS from the CU based on the first time information (S620). The DU may receive the synchronization information with the GPS from the CU that has already completed synchronization with the GPS. The DU may obtain a system frame number (SFN) value of the GPS from the synchronization information with the GPS (S630). Both the CU and DU may be synchronized to have the same SFN value as the GPS. As described above, the configuration of the present disclosure has been described by exemplifying the synchronization operation between the CU and the DU based on the synchronization operation previously performed between the CU and the GPS, but exemplary embodiments of the present disclosure are not limited thereto. In another exemplary embodiment of the present disclosure, the DU may use a time offset between the timing information of the CU and the timing information of the GPS when performing timing synchronization with the CU. In the timing synchronization between the DU and the CU, the DU may identify the timing information of the CU based on the first time information. The DU may identify the timing information of GPS based on the second time information. The DU may identify a timing offset between the timing information of the CU and the timing information of GPS. For timing synchronization with the CU, the DU may initially synchronize with the CU based on the first time information received from the CU. Thereafter, the DU may synchronize with the CU based on the timing offset between the CU and the GPS and the timing information of the GPS.

According to the step S630 and the like, the DU may identify information on the SFN of the CU or GPS. The DU may perform a timing control operation based on the identified SFN information. The DU may generate at least one timing control signal for a timing control operation. The DU may provide at least one generated timing control signal to the modem of the DU.

The DU may identify a time when the SFN is changed. When the SFN is changed, the DU may generate a first timing control signal. The first timing control signal may include a signal indicating a changed SFN and a first tick signal having the same periodicity as the change periodicity of the SFN. The SFN change periodicity may be 10 ms. The first tick signal may be a 10 ms tick signal. The DU may provide the generated first timing control signal to the modem of the DU (S640). The first timing control signal may be transmitted to the modem at a periodicity of a 10 ms.

The DU may determine subframe number(s) of one or more subframes based on the time point at which the SFN is changed. The DU may determine a change time point of each of the subframe number(s). The DU may generate a second timing control signal at a change time point of each of the subframe number(s). The second timing control signal may include a signal indicating a changed subframe number and a second tick signal having the same periodicity as the change periodicity of the subframe number. As an example, the DU may determine 10 subframe numbers from 0 to 9 whenever the SFN is changed, and may determine a time point at which each of the 10 subframe numbers is changed. The change periodicity of the subframe number may be 1 ms. The second tick signal may be a 1 ms tick signal. A time required to change the 10 subframe numbers may be the same as the SFN change periodicity. The DU may provide the generated second timing control signal to the modem of the DU (S650). The second timing control signal may be transmitted to the modem at a periodicity of 1 ms.

The DU may determine slot number(s) of one or more slots constituting each subframe. The DU may determine a change time point of each of the slot number(s). The DU may generate a third timing signal at a time point at which each of the slot number(s) is changed. The third timing control signal may include a signal indicating a changed slot number and a third tick signal indicating a change of the slot number. The DU may provide the generated third timing control signal to the modem of the DU (S660).

The third timing signal or the third tick signal may be generated and transmitted whenever the slot number is changed. The third timing signal may be periodically or aperiodically generated and transmitted according to the value of μ according to the subcarrier spacing. As described with reference to FIG. 5, slots may be composed of OFDM symbols using the short-CP, and may additionally include OFDM symbols using the long-CP. When the value of μ is 0 or 1, all slots may be configured to include OFDM symbols using the long-CP. On the other hand, when the value of μ is 2 to 4, some slots may be configured to include OFDM symbols using the long-CP, and the remaining slots may be configured only with OFDM symbols using the short-CP.

When the value of μ according to the SCS is 0 or 1, all slots may be configured to have the same time duration. That is, when the value of μ is 0 or 1, the third timing control signal may be generated and transmitted at a constant time interval. In other words, when the value of μ is 0 or 1, the third timing control signal may be periodically generated and transmitted with a constant periodicity. On the other hand, when the value of μ is 2 to 4, some slots may be configured to have a different time interval from the remaining slots. That is, when the value of μ is 2 to 4, the third timing control signal may be generated and transmitted at non-uniform time intervals. In other words, when the value of μ is 2 to 4, the third timing control signal may be generated and transmitted aperiodically.

The DU may determine symbol number(s) of one or more symbols constituting each slot. The DU may identify when the symbol number is changed. When the symbol number is changed, the DU may generate a fourth timing control signal including a signal indicating the changed symbol number and a fourth tick signal indicating the change of the symbol number. The DU may provide the generated fourth timing control signal to the modem (S670).

The modem of the DU may receive the first to fourth timing control signals described with reference to FIG. 6, or a part thereof. The modem may obtain timing information based on the received timing control signal(s). For example, the modem of the DU may receive all of the first to fourth timing control signals described with reference to FIG. 6, and may obtain the timing information at every instant through the received first to fourth timing control signals. Alternatively, the modem of the DU may receive some of the first to fourth timing control signals described with reference to FIG. 6, and calculate and obtain total timing information based on the received timing control signal(s). For example, the modem of the DU may receive the first timing control signal, and obtain information about the change time point of the SFN from the first timing control signal. The modem of the DU may obtain total timing information by calculating the change time point of each subframe, the change time point of each slot, and the change time point of each symbol based on the obtained information on the change time point of the SFN. The modem may perform a modem function based on the obtained timing information. Accordingly, the modem of the DU may perform the modem function with the same timing information as the CU.

According to an exemplary embodiment of the present disclosure, the DU constituting the base station to which function-splitting is applied may obtain time information and synchronization information from the CU constituting the same base station and a GPS, and perform synchronization with the CU based on the obtained information.

According to an exemplary embodiment of the present disclosure, the DU constituting the base station to which function-splitting is applied may generate a timing control signal based on the time information and synchronization information obtained from the CU and the GPS, and provide the generated timing control signal to the modem of the DU. Accordingly, the modem of the DU may be operated with the same timing information as the CU directly having the timing information of the base station, thereby improving the reliability of the base station functions.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A timing control method, performed by a first distributed unit (DU) including a processor and a modulator and demodulator (modem) in a base station supporting function-splitting, the timing control method comprising:
    obtaining, by the processor, first time information from a central unit (CU) included in the base station;
    obtaining, by the processor, synchronization information with a first system based on the first time information;
    identifying, by the processor, a change time point of a system frame number (SFN) based on the synchronization information;
    generating, by the processor, a first timing control signal including a signal indicating a changed SFN and a first tick signal having a same periodicity as a change periodicity of the SFN when the SFN is changed;
    determining, by the processor, one or more subframe numbers of one or more subframes based on the change time point of the SFN;
    determining, by the processor, a change time point of each of the one or more subframe numbers;
    generating, by the processor, a second timing control signal including a signal indicating a changed subframe number and a second tick signal having a same periodicity as a change periodicity of the subframe number at the change time point of each of the one or more subframe numbers;
    determining, by the processor, one or more slot numbers of one or more slots constituting the one or more subframes;
    determining, by the processor, a change time point of each of the one or more slot numbers based on the change time point of each of the one or more subframe numbers;
    generating, by the processor, a third timing control signal including a signal indicating a changed slot number and a third tick signal indicating a change of the slot number at the change time point of each of the one or more slot numbers;
    determining, by the processor, one or more symbol numbers of one or more symbols constituting the one or more slots;
    determining, by the processor, a change time point of each of the one or more symbol numbers based on the change time point of each of the one or more slot numbers;
    generating, by the processor, a fourth timing control signal including a changed symbol number and a fourth tick signal indicating a change of the symbol number at the change time point of each of the one or more symbol numbers; and providing, by the processor, the first timing control signal, the second timing control signal, the third timing control signal, and the fourth timing control signal to the modem.

2. The timing control method according to claim 1, wherein the synchronization information with the first system is provided from the CU that has previously performed synchronization with the first system to the first DU, based on the first time information.

3. The timing control method according to claim 2, wherein the first time information is coordinated universal time (UTC) information, and the first system is a global positioning system (GPS).

4. The timing control method according to claim 1, wherein the timing control method is performed in a synchronization plane (S-plane) of the first DU.

5. The timing control method according to claim 1, wherein the obtaining of the first time information is performed based on IEEE 1588 protocol.

6. A first distributed unit (DU) included in a base station supporting function-splitting, the first DU comprising:
a processor;
a modulator and demodulator (MODEM);
a memory electronically communicating with the processor; and
instructions stored in the memory,
wherein when executed by the processor, the instructions cause the first DU to:
obtain, by the processor, first time information from a central unit (CU) included in the base station;
obtain, by the processor, synchronization information with a first system based on the first time information;
identify, by the processor, a change time point of a system frame number (SFN) based on the synchronization information;
generate, by the processor, a first timing control signal including a signal indicating a changed SFN and a first tick signal having a same periodicity as a change periodicity of the SFN when the SFN is changed;
determine, by the processor, one or more subframe numbers of one or more subframes based on the change time point of the SFN;
determine, by the processor, a change time point of each of the one or more subframe numbers;
generate, by the processor, a second timing control signal including a signal indicating a changed subframe number and a second tick signal having a same periodicity as a change periodicity of the subframe number at the change time point of each of the one or more subframe numbers;
determine, by the processor, one or more slot numbers of one or more slots constituting the one or more subframes;
determine, by the processor, a change time point of each of the one or more slot numbers based on the change time point of each of the one or more subframe numbers;
generate, by the processor, a third timing control signal including a signal indicating a changed slot number and a third tick signal indicating a change of the slot number at the change time point of each of the one or more slot numbers;
determine, by the processor, one or more symbol numbers of one or more symbols constituting the one or more slots;

determine, by the processor, a change time point of each of the one or more symbol numbers based on the change time point of each of the one or more slot numbers;
generate, by the processor, a fourth timing control signal including a changed symbol number and a fourth tick signal indicating a change of the symbol number at the change time point of each of the one or more symbol numbers; and
provide, by the processor, the first timing control signal, the second timing control signal, the third timing control signal, and the fourth timing control signal to the modem.

7. The first DU according to claim 6, wherein the synchronization information with the first system is provided from the CU that has previously performed synchronization with the first system to the first DU, based on the first time information.

8. The first DU according to claim 7, wherein the first time information is coordinated universal time (UTC) information, and the first system is a global positioning system (GPS).

9. A timing control method, performed by a first communication node including a processor and a modulator and demodulator (MODEM) in a base station supporting function-splitting, the timing control method comprising:
obtaining, by the processor, first time information from a second communication node included in the base station;
obtaining, by the processor, synchronization information with a first system based on the first time information;
identifying, by the processor, a change time point of a system frame number (SFN) based on the synchronization information;
generating, by the processor, a first timing control signal including a signal indicating a changed SFN and a first tick signal having a same periodicity as a change periodicity of the SFN when the SFN is changed;
determining, by the processor, one or more subframe numbers of one or more subframes based on the change time point of the SFN;
determining, by the processor, a change time point of each of the one or more subframe numbers;
generating, by the processor, a second timing control signal including a signal indicating a changed subframe number and a second tick signal having a same periodicity as a change periodicity of the subframe number at the change time point of each of the one or more subframe numbers;
determining, by the processor, one or more slot numbers of one or more slots constituting the one or more subframes;
determining, by the processor, a change time point of each of the one or more slot numbers based on the change time point of each of the one or more subframe numbers;
generating, by the processor, a third timing control signal including a signal indicating a changed slot number and a third tick signal indicating a change of the slot number at the change time point of each of the one or more slot numbers;
determining, by the processor, one or more symbol numbers of one or more symbols constituting the one or more slots;

determining, by the processor, a change time point of each of the one or more symbol numbers based on the change time point of each of the one or more slot numbers;

generating, by the processor, a fourth timing control signal including a changed symbol number and a fourth tick signal indicating a change of the symbol number at the change time point of each of the one or more symbol numbers; and providing, by the processor, the first timing control signal, the second timing control signal, the third timing control signal, and the fourth timing control signal to the modem, wherein the first communication node and the second communication node correspond to an open radio access network (O-RAN) radio unit (O-RU) and an O-RAN distributed unit (O-DU) according to O-RAN alliance communication specifications, respectively.

10. The timing control method according to claim 9, wherein the synchronization information with the first system is provided from the second communication node that has previously performed synchronization with the first system to the first communication node, based on the first time information.

11. The timing control method according to claim 10, wherein the first time information is coordinated universal time (UTC) information, and the first system is a global positioning system (GPS).

* * * * *